United States Patent
Son et al.

(10) Patent No.: US 9,165,354 B2
(45) Date of Patent: Oct. 20, 2015

(54) METHOD OF ANALYZING PHOTOLITHOGRAPHY PROCESSES

(71) Applicant: Samsung Electronics Co., Ltd., Suwon-si (KR)

(72) Inventors: Woong-Kyu Son, Hwaseong-si (KR); Hyo-Cheon Kang, Hwaseong-si (KR); Deok-Yong Kim, Gunpo-si (KR); Jae-Kwan Park, Suwon-si (KR); Jeong-Ho Ahn, Hwaseong-si (KR); Soo-Bok Chin, Seoul (KR)

(73) Assignee: Samsung Electronics Co., Ltd. (KR)

(*) Notice: Subject to any disclaimer, the term of this patent is extended or adjusted under 35 U.S.C. 154(b) by 176 days.

(21) Appl. No.: 13/908,608

(22) Filed: Jun. 3, 2013

(65) Prior Publication Data

US 2014/0037186 A1 Feb. 6, 2014

(30) Foreign Application Priority Data

Jul. 31, 2012 (KR) .................. 10-2012-0084001

(51) Int. Cl.
- *G06K 9/00* (2006.01)
- *G06T 7/00* (2006.01)
- *G06T 7/40* (2006.01)

(52) U.S. Cl.
CPC ............. *G06T 7/0004* (2013.01); *G06T 7/0006* (2013.01); *G06T 7/402* (2013.01); *G06T 2207/10061* (2013.01); *G06T 2207/20056* (2013.01); *G06T 2207/30148* (2013.01)

(58) Field of Classification Search
None
See application file for complete search history.

(56) References Cited

U.S. PATENT DOCUMENTS

| 7,354,684 B2* | 4/2008 | Dersch et al. ................ 430/30 |
| 2007/0280557 A1* | 12/2007 | Choi et al. .................. 382/294 |
| 2009/0263024 A1* | 10/2009 | Yamaguchi et al. .......... 382/199 |
| 2010/0128147 A1* | 5/2010 | Chang et al. ................ 348/241 |
| 2011/0194752 A1* | 8/2011 | Pang ........................... 382/149 |
| 2012/0106824 A1* | 5/2012 | Archie et al. ............... 382/141 |

FOREIGN PATENT DOCUMENTS

| JP | 2006-073867 | 3/2006 |
| JP | 2011-007581 | 1/2011 |
| KR | 10-2007-0091573 | 11/2007 |

OTHER PUBLICATIONS

Villarrubia, *Issues in Line Edge and Linewidth Roughness Metrology*; National Institute of Standards and Technology, vol. 778, pp. 386-393, Jan. 1, 2005.

* cited by examiner

*Primary Examiner* — Amara Abdi
(74) *Attorney, Agent, or Firm* — Myers Bigel Sibley & Sajovec, P.A.

(57) ABSTRACT

Methods of analyzing photolithography processes are provided. The methods may include obtaining an image from a pattern formed on a wafer and obtaining dimensions of the image. The methods may further include converting the dimensions into a profile graph and then dividing the profile graph into a low-frequency band profile graph and a high-frequency band profile graph.

19 Claims, 13 Drawing Sheets

METHOD OF ANALYZING PHOTOLITHOGRAPHY PROCESSES

CROSS-REFERENCE TO RELATED APPLICATION

This U.S. non-provisional patent application claims priority under 35 U.S.C. §119 to Korean Patent Application No. 10-2012-0084001, filed on Jul. 31, 2012, in the Korean Intellectual Property Office, the disclosure of which is hereby incorporated by reference in its entirety.

FIELD

The present disclosure generally relates to the field of electronics, and more particularly to manufacturing processes for semiconductor devices.

BACKGROUND

Various technologies for photolithography processes can form fine patterns with good patterning uniformity for manufacturing high-density semiconductor devices.

SUMMARY

A method of analyzing photolithography processes may include obtaining a line image from a pattern formed on a wafer, the line image including a first line and a second line parallel to the first line. The method may further include obtaining dimensions between the first and second lines along a lengthwise direction of the line image. The method may also include converting the dimensions into a profile graph and dividing the profile graph into a low-frequency band profile graph and a high-frequency band profile graph.

In various embodiments, each of the profile graph, the low-frequency band profile graph and the high-frequency band profile graph may include a graph in a location domain.

In various embodiments, dividing the profile graph may include performing a Fourier transform on the profile graph to obtain a frequency graph in a frequency domain.

According to various embodiments, dividing the profile graph may further include dividing the frequency graph into a low-frequency band graph and a high-frequency band graph.

According to various embodiments, dividing the profile graph may further include performing an inverse Fourier transform on the low-frequency band graph and the high-frequency band graph to obtain the low-frequency band profile graph and the high-frequency band profile graph, respectively.

In various embodiments, the method may include additionally analyzing the low-frequency band profile graph to analyze macroscopic line roughness of the line image and analyzing the high-frequency band profile graph to analyze microscopic line roughness of the line image.

According to various embodiments, obtaining the dimensions may include obtaining preliminary dimensions between the first and second lines along the lengthwise direction of the line image, dividing the line image into sections along the lengthwise direction of the line image and obtaining the dimensions by calculating averages of the preliminary dimensions in the respective sections.

According to various embodiments, the method may further include calculating standard deviations of the dimensions.

In various embodiments, obtaining the preliminary dimensions may include measuring raw dimensions between the first and second lines along the lengthwise direction of the line image, dividing the line image into subsections smaller than the sections along the lengthwise direction of the line image and obtaining the preliminary dimensions by calculating averages of the raw dimensions in the respective subsections.

In various embodiments, the method may include overlapping a plurality of cross patterns on the line image and obtaining of the dimensions between the first and second lines may include obtaining the dimensions of the line image in regions in which the line image overlaps with the plurality of cross patterns According to various embodiments, the plurality of cross patterns may be disposed along the lengthwise direction of the line image.

According to various embodiments, the line image may include a graphic image obtained by photographing a pattern formed on a wafer.

A method of analyzing photolithography processes may include obtaining a line image by photographing a pattern formed on a wafer and converting the line image into a profile graph in a location domain. The method may further include dividing the profile graph into a low-frequency band profile graph and a high-frequency band profile graph. The method may also include analyzing the low-frequency band profile graph and the high-frequency band profile graph.

In various embodiments, the line image may include a first line and a second line parallel to the first line and the profile graph may include an image of the first line.

According to various embodiments, dividing the profile graph into the low-frequency band profile graph and the high-frequency band profile graph may include performing a Fourier transform on the profile graph to obtain a frequency-domain graph, dividing the frequency-domain graph into a low-frequency band graph and a high-frequency band graph and performing an inverse Fourier transform on the low-frequency band graph and the high-frequency band graph to obtain the low-frequency band profile graph and the high-frequency band profile graph in the location domain.

A method of analyzing characteristics of a process may include obtaining dimensions of a pattern formed on a wafer with respect to location parameters and calculating frequency domain dimensions of the pattern with respect to frequencies from the dimensions of the pattern. The method may further include identifying ones of the frequency domain dimensions that are within a low-frequency group and a high-frequency group. The method may also include calculating low-frequency dimensions and high-frequency dimensions with respect to the location parameters from the low-frequency group and the high-frequency group respectively.

According to various embodiments, the dimensions of the pattern may include widths of the pattern or distances between a sidewall of the pattern and a reference line.

In various embodiments, calculating frequency domain dimensions of the pattern may include performing a Fourier transform on the dimensions of the pattern.

In various embodiments, obtaining the dimensions may include obtaining preliminary dimensions of the pattern, dividing the pattern into a plurality of sections and obtaining the dimensions by calculating the average values of the preliminary dimensions in respective ones of the plurality of sections.

According to various embodiments, obtaining the dimensions may include sampling portions of the dimensions.

DETAILED DESCRIPTION OF THE EMBODIMENTS

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will convey the scope of the disclosure to those skilled in the art. Thus, the inventive concept may be embodied in different forms and should not be construed as limited to the embodiments set forth herein.

In the drawings, the sizes and relative sizes of layers and regions may be exaggerated for clarity. The specific terms, embodiments, and drawings, and the like that are used in the present disclosure are not intended to restrict the scope of the inventive concept and only used for a better understanding of the inventive concept.

In the drawings, pattern images are exaggerated to assist understanding of the inventive concept.

Unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The inventive concept can be applied to various methods, e.g., a method of analyzing a pattern formed using a photolithography process, a method of analyzing a photolithography process, and a method of analyzing the relationship between a photolithography process and a pattern. In the present disclosure, the inventive concept has been described with respect to a method of analyzing a photolithography process but may be extended and applied in various ways as described above.

Some embodiments may be embodied as methods, systems, and/or computer program products. Accordingly, some embodiments may be embodied in hardware, including any types of computer having processors, and/or in software, including firmware, resident software, micro-code. Furthermore, some embodiments may take the form of a computer program product comprising a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples of the computer-readable medium would include an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIGS. 1, 2A to 2E are a flowchart and diagrams illustrating a method of analyzing a photolithography process in accordance with some embodiments of the inventive concept.

Figure 1:
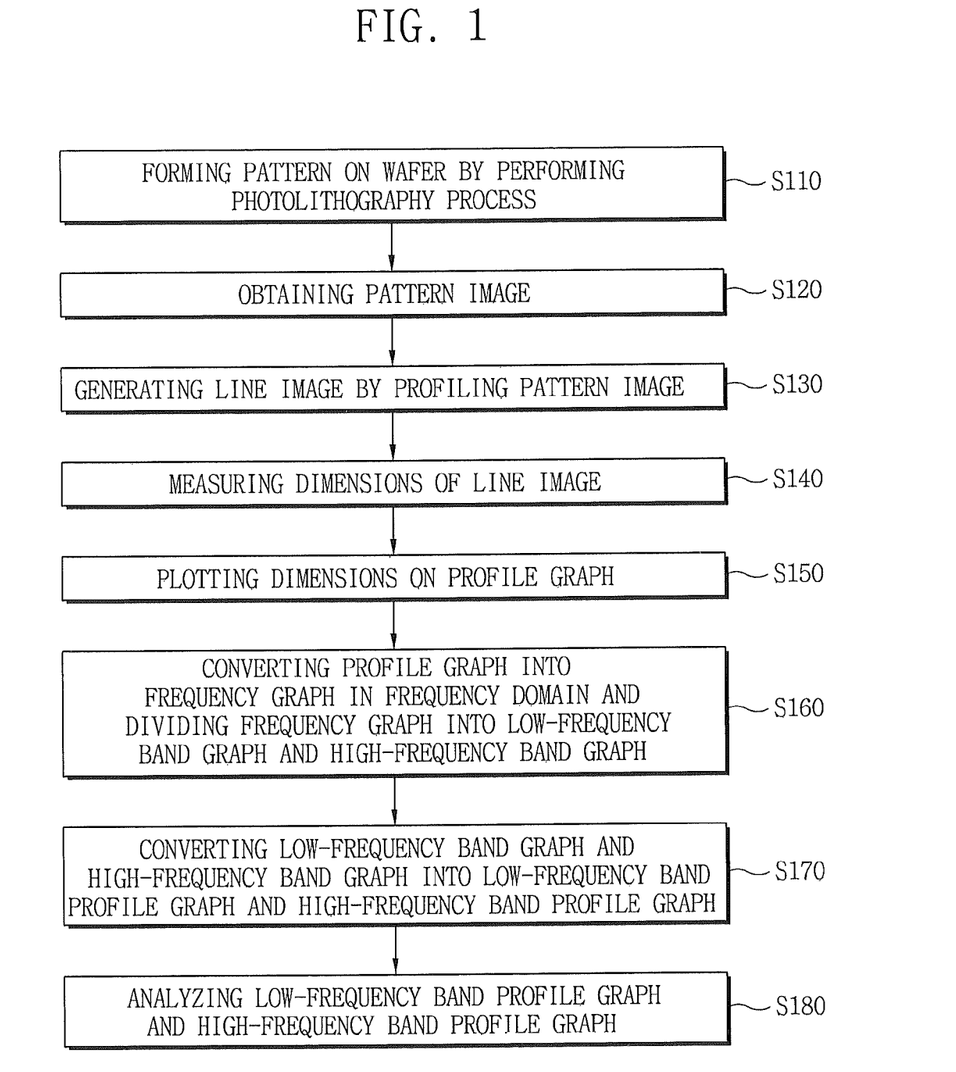
FIG. 1 is a flowchart illustrating a method of analyzing a photolithography process in accordance with some embodiments of the inventive concept.
Figure 2A:
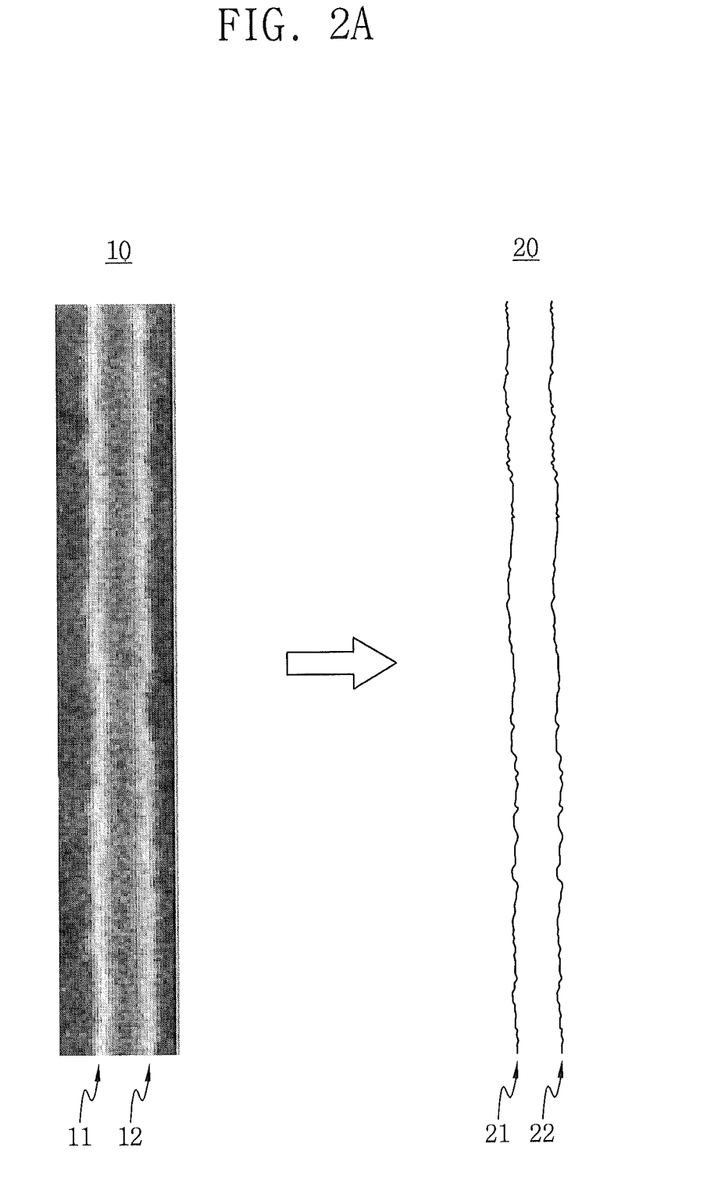
FIGS. 2A to 2E are diagrams illustrating a method of analyzing a photolithography process in accordance with some embodiments of the inventive concept.

Referring to FIGS. 1 and 2A, the method may include forming a pattern on a wafer by performing a photolithography process (S110), obtaining a pattern image 10 by photographing the pattern by using a scanning electronic microscope (SEM) or the like (S120), and generating a line image 20 by profiling the pattern image 10 (S130).

The pattern image 10 may include a first side 11 and a second side 12. The line image 20 may include a first line 21 and a second line 22. The first and second lines 21 and 22 of the line image 20 may correspond to the first side 11 and the second side 12 of the pattern image 10, respectively. For example, the first line 21 and the second line 22 of the line image 20 may be profiled by converting the first side 11 and the second side 12 of the pattern image 10 into graphic images, or by continuously plotting a plurality of points.

Figure 2B:
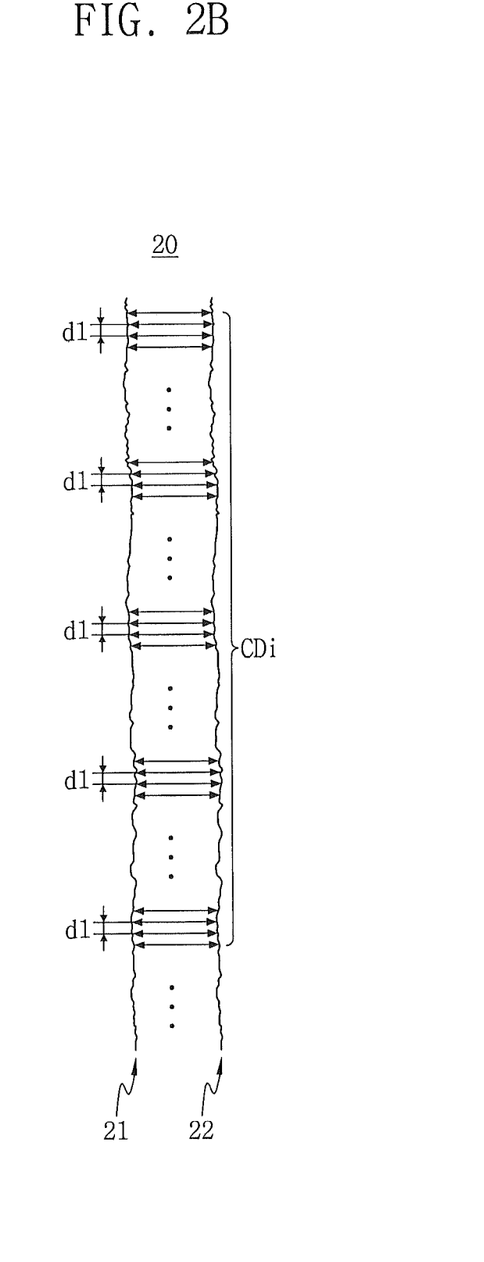

Referring to FIGS. 1 and 2B, the method may further include measuring dimensions CDi of the line image 20 (S140). For example, the method may further include the dimensions CDi of the line image 20 at intervals of a distance d1. The distance d1 may be set to any of various values. For example, the distance d1 may be a multiple of a minimum resolution of measuring equipment.

Figure 2C:
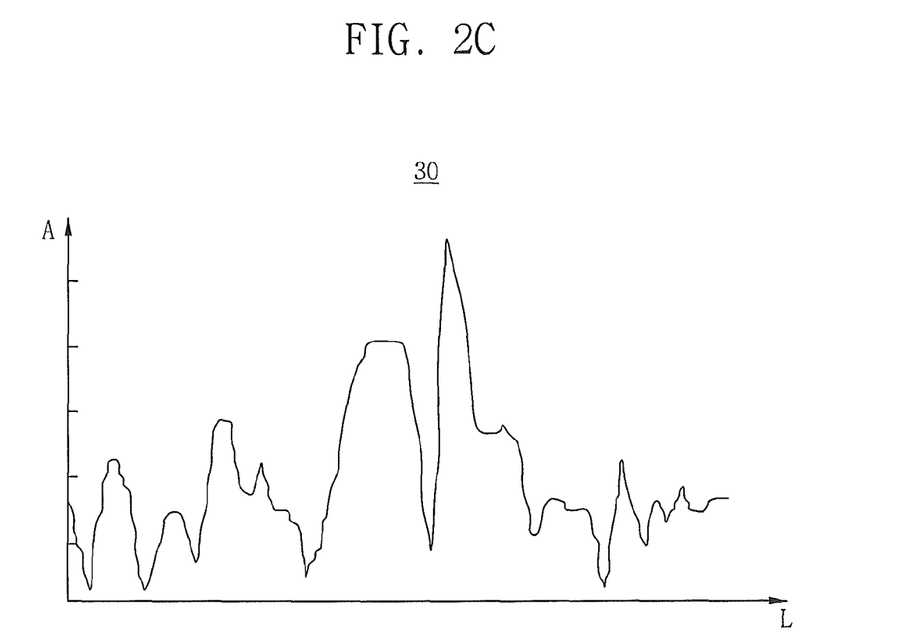

Referring to FIGS. 1 and 2C, the method may further include plotting the measured dimensions CDi on a profile graph 30 (S150). The plotting of the dimensions CDi on the profile graph 30 may include plotting points at which the dimensions CDi are measured. To assist understanding of the inventive concept, the profile graph 30 is exaggerated in such a manner that a variation in the dimensions CDi may be sufficiently visually identified. The profile graph 30 is a graph in a location domain, in which an X-axis denotes location (L) and a Y-axis denotes amplitude (A).

Figure 2D:
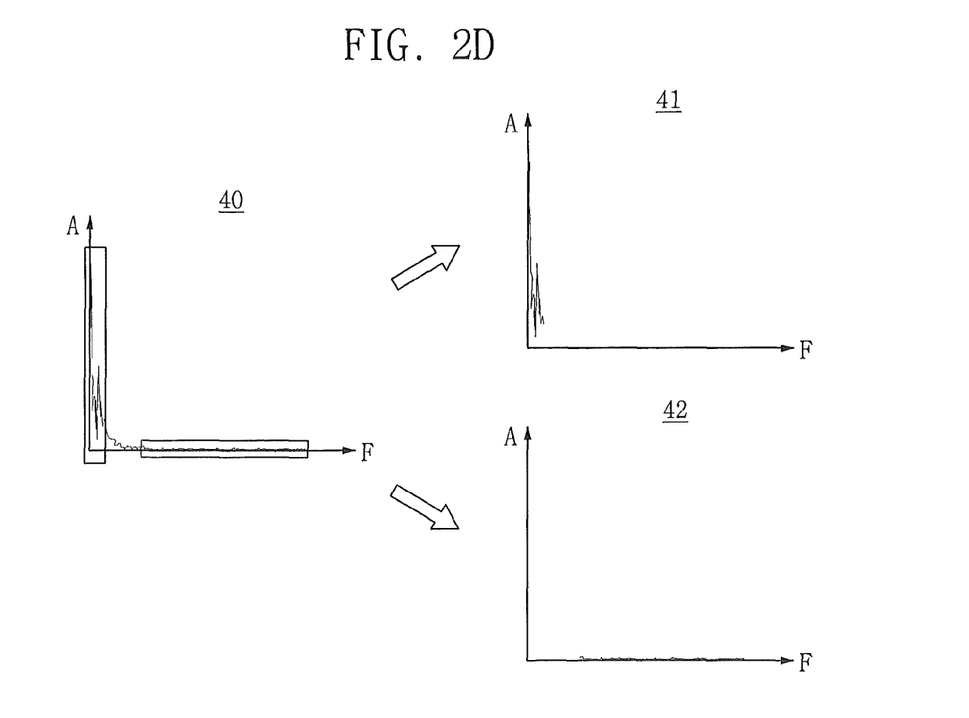

Referring to FIGS. 1 and 2D, the method may further include converting the profile graph 30 into a frequency graph 40 in a frequency domain, and dividing the frequency graph 40 into a low-frequency band graph 41 and a high-frequency band graph 42 (S160). For example, S160 may include converting the profile graph 30 into the frequency graph 40 in the frequency domain by performing Fourier transform, and dividing the frequency graph 40 in the frequency domain into the low-frequency band graph 41 and the high-frequency band graph 42 by using a band-pass filter.

Figure 2E:
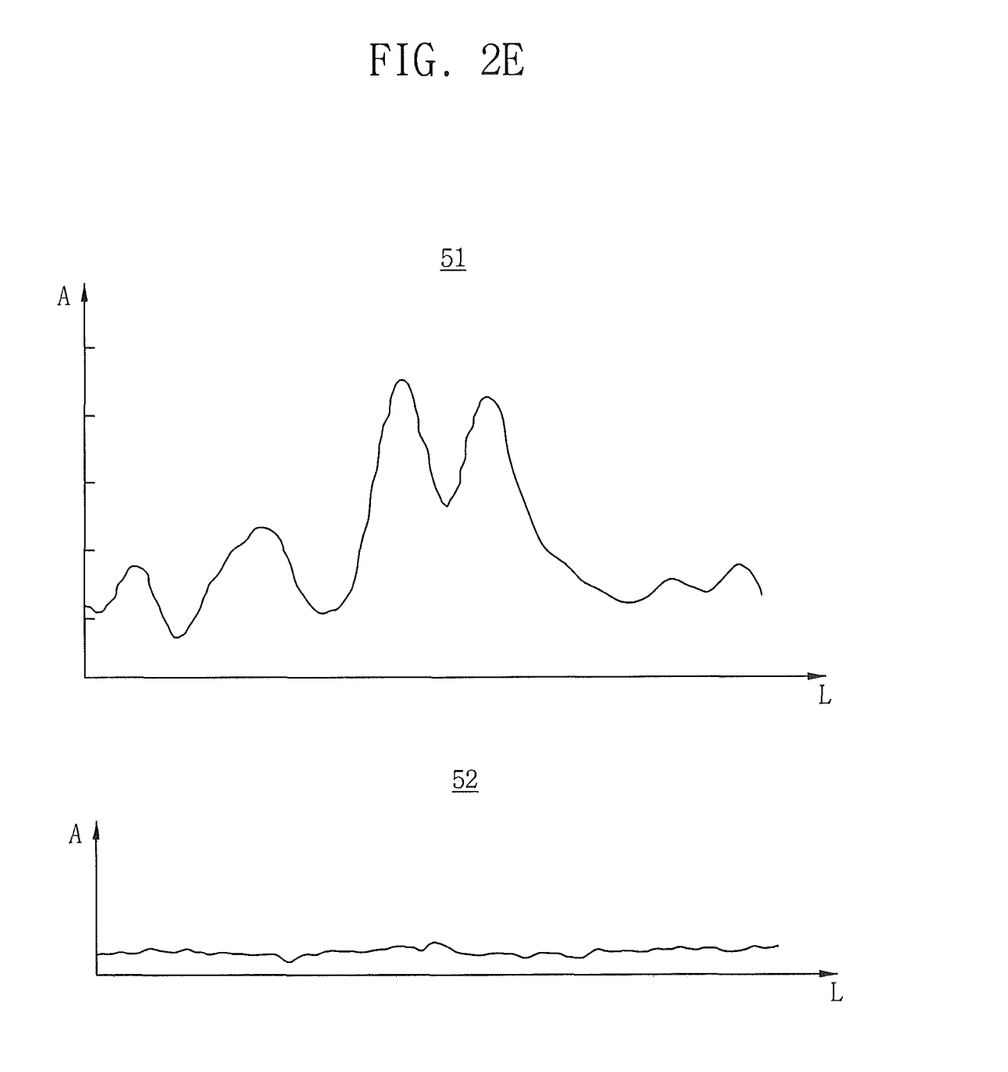

Referring to FIGS. 1 and 2E, the method may further include converting the low-frequency band graph 41 and the high-frequency band graph 42 in the frequency domain into a low-frequency band profile graph 51 and a high-frequency band profile graph 52 in a location domain by performing inverse Fourier transform (S170). For example, the low-frequency band graph 41 in the frequency domain may be converted into the low-frequency band profile graph 51 in the location domain, and the high-frequency band graph 42 in the frequency domain may be converted into the high-frequency band profile graph 52 in the location domain.

Then, the method may further include analyzing the low-frequency band profile graph 51 and the high-frequency band profile graph 52 (S180). For example, the low-frequency band profile graph 51 may represent a macroscopic variation in the dimensions CDi of the line image 20 or macroscopic line roughness of the line image 20, and the high-frequency band profile graph 52 may represent a microscopic variation in the dimensions CDi of the line image 20 or macroscopic line roughness of the line image 20.

Thus, the dimensions CDi and line roughness of the line image 20 may be numerically analyzed, and the pattern formation capability of the photolithography process may be analyzed, estimated, and predicted. In other words, according to the inventive concept, patterns may be formed according to various photolithography processes, and macroscopic and microscopic variations in dimensions of the patterns and macroscopic and microscopic line roughnesses of the patterns may be analyzed. Thus, the pattern formation capability of each of the photolithography processes may be evaluated. Also, photolithography processes appropriate to improve macroscopic line roughness, and photolithography processes appropriate to improve microscopic line roughness may be combinationally or dependently subdivided in various ways. Accordingly, when line roughness of a pattern needs to be improved, a photolithography process useful to improve line roughness among the photolithography processes may be predicted. Various photolithography processes may be produced from combinations of various process conditions including a light source, e.g., extreme ultraviolet (EUV) light, photolithography equipment, e.g., a scanner, an illumination method, e.g., off-axis illumination (OAI), the type of photomask, e.g., a reflective or phase-shift mask (PSM), a photoresist, a developer, the type of etchant, a recipe, and the like.

FIGS. 3 and 4A to 4C are a flowchart and diagrams illustrating a method of analyzing a photolithography process in accordance with another embodiment of the inventive concept.

Figure 3:
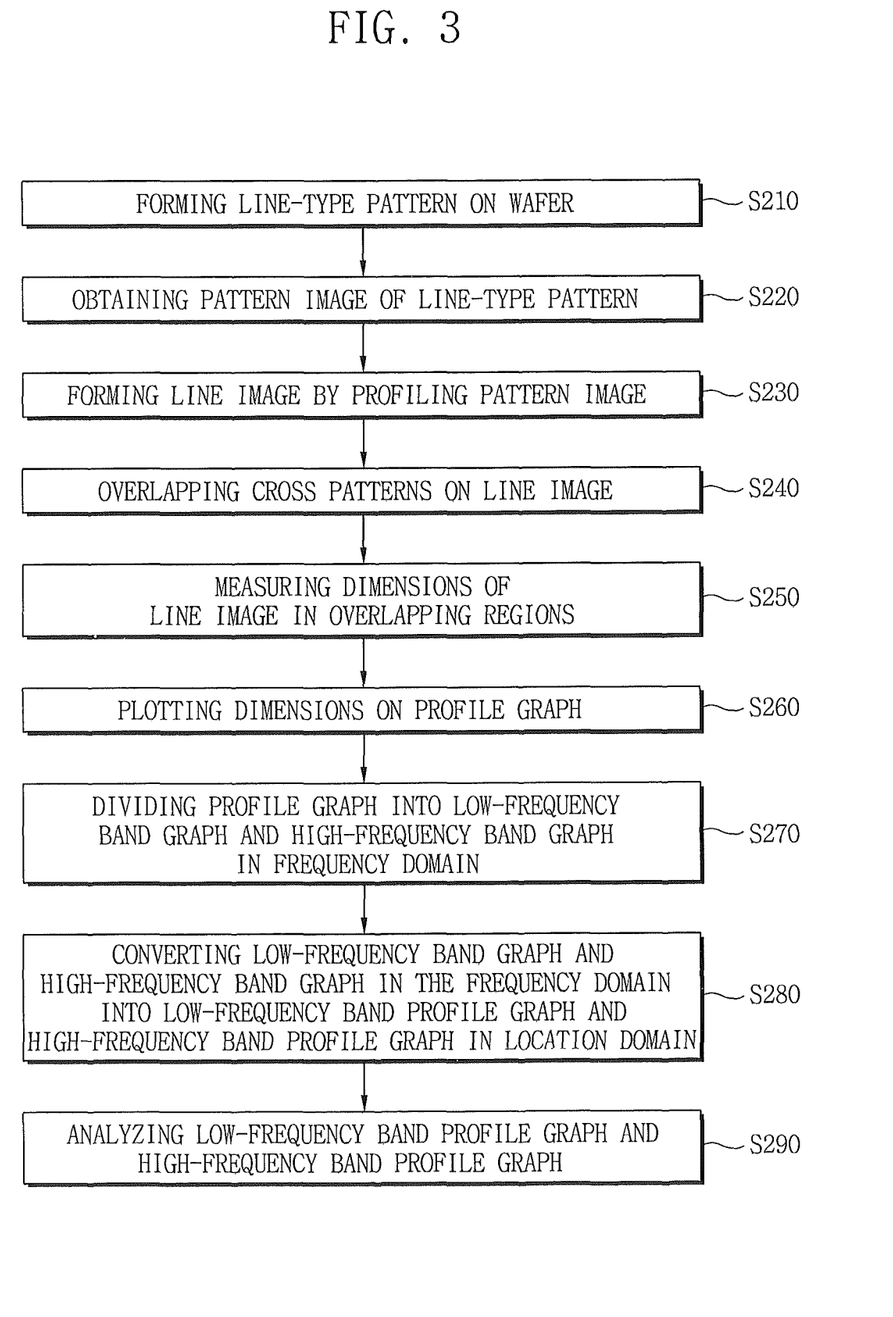
FIG. 3 is a flowchart illustrating a method of analyzing a photolithography process in accordance with some embodiments of the inventive concept.
Figure 4A:
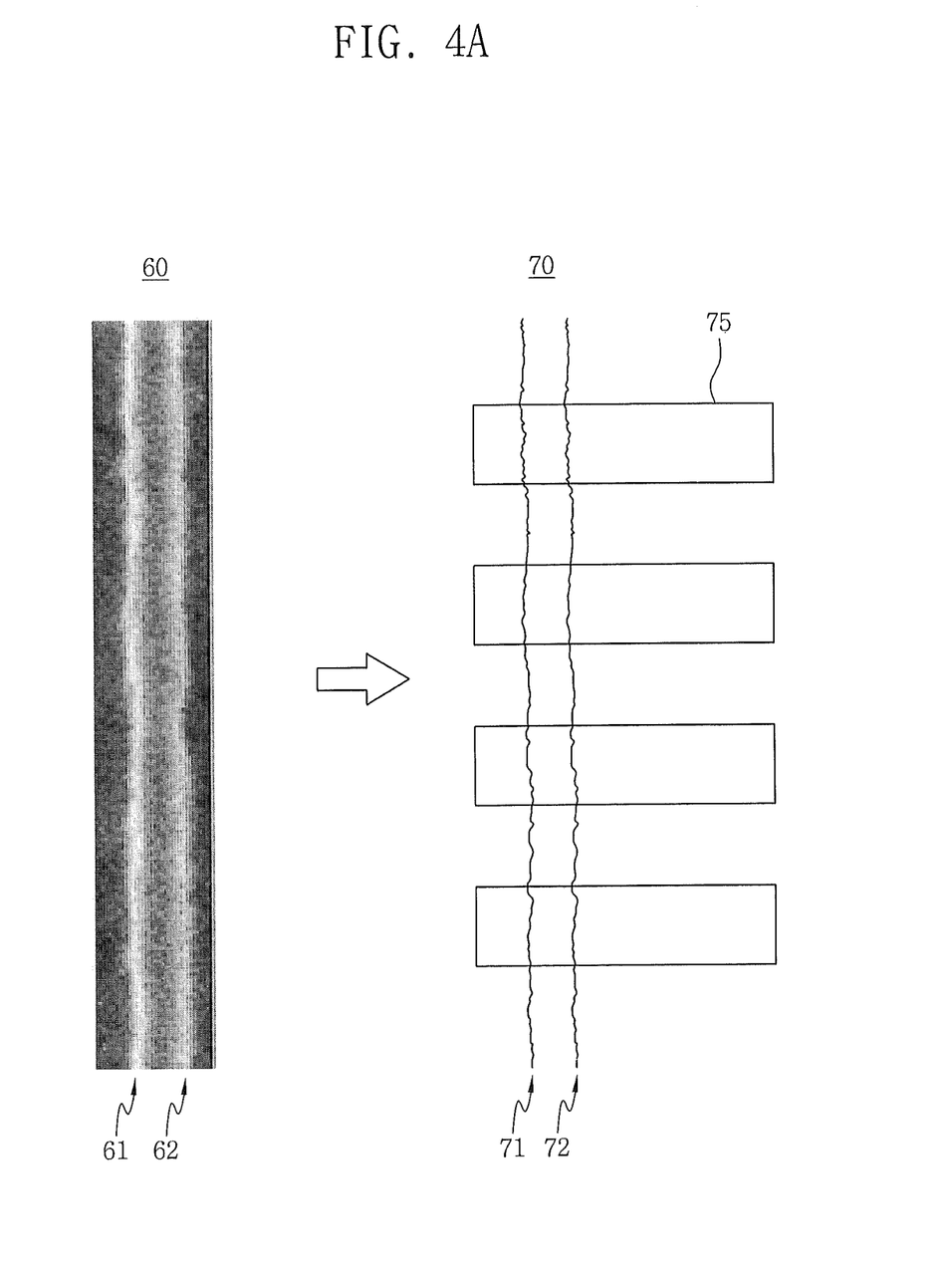
FIGS. 4A to 4C are diagrams illustrating a method of analyzing a photolithography process in accordance with some embodiments of the inventive concept.

Referring to FIGS. 3 and 4A, the method may include forming a line-type pattern on a wafer by performing a photolithography process (S210), obtaining a pattern image 60 of the line-type pattern (S220), forming a line image 70 including a first line 71 and a second line 72 by profiling a first side 61 and a second side 62 of the pattern image 60 (S230), and overlapping a plurality of cross patterns 75 on the line image 70 (S240). The line image 70 may be divided by the plurality of cross patterns 75 in a lengthwise direction thereof. The line image 70 may include a line pattern, e.g., a gate pattern. The plurality of cross patterns 75 may include a bar-type pattern, e.g., an active pattern. In the drawings, the plurality of cross patterns 75 may represent an outline or layout of the active pattern.

Figure 4B:
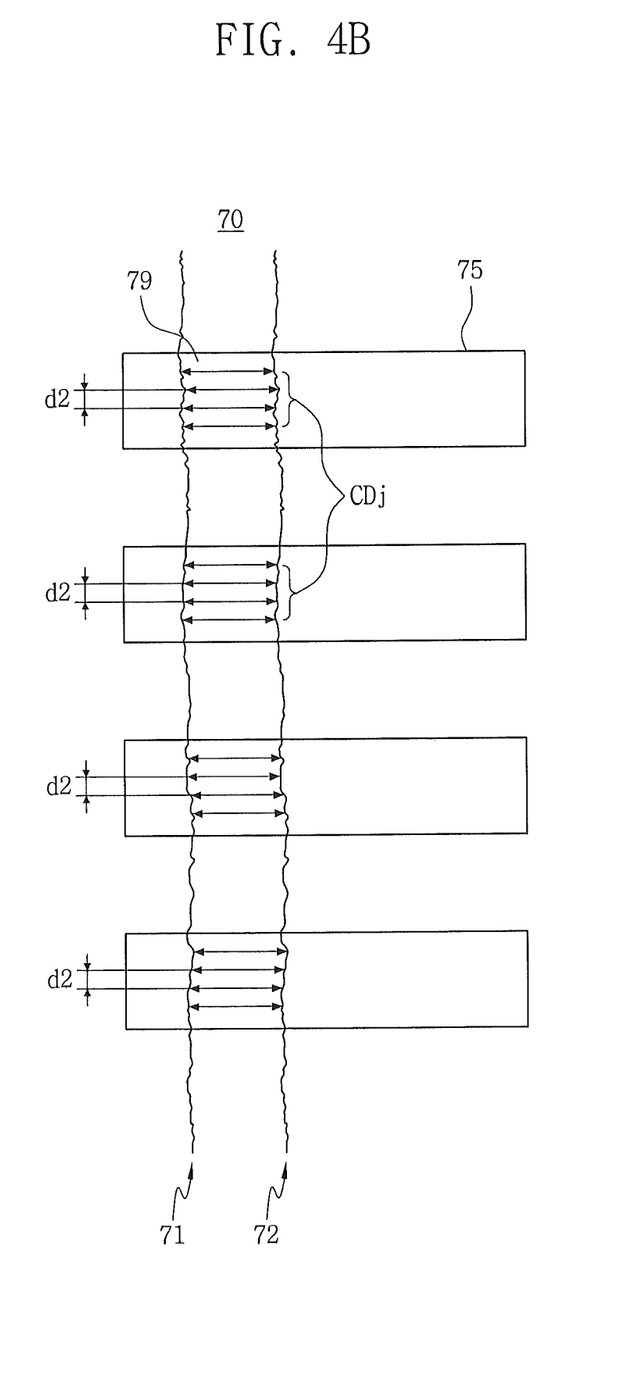

Referring to FIGS. 3 and 4B, the method may further include measuring dimensions CDi of the line image 70 in overlapping regions 79 in which the line image 70 overlaps with the plurality of cross patterns 75 (S250). The dimensions CDj may be measured several times at intervals of a predetermined distance d2.

Figure 4C:
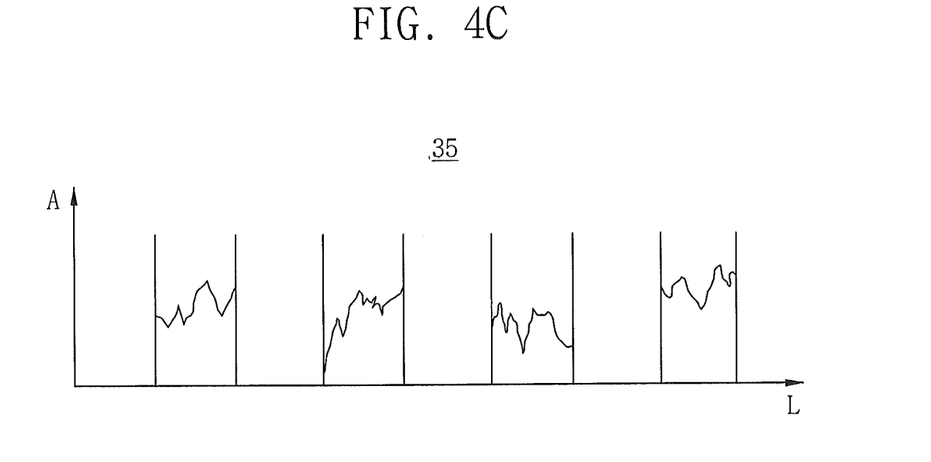

Referring to FIGS. 3 and 4C, the method may further include plotting the dimensions CDj on a profile graph 35 (S260).

Referring back to FIGS. 2D and 2E, the method of FIGS. 3 and 4A to 4C may further include dividing the profile graph 35 into a low-frequency band graph and a high-frequency band graph in a frequency domain (S270), converting the low-frequency band graph and the high-frequency band graph in the frequency domain into a low-frequency band profile graph and a high-frequency band profile graph in a location domain (S280), and analyzing the low-frequency band profile graph and the high-frequency band profile graph (S290).

According to the present embodiment, the dimensions CDi or line roughness of the line image 70 may be analyzed by extracting only the overlapping regions 79 in which the line image 70 and the plurality of cross patterns 75 overlap with one another. Thus, since the dimensions CDj and line roughness of the line image 70 may be analyzed while excluding unnecessary parts of the line-type pattern, more accurate information regarding a pattern and a photolithography process may be obtained.

Figure 5A:
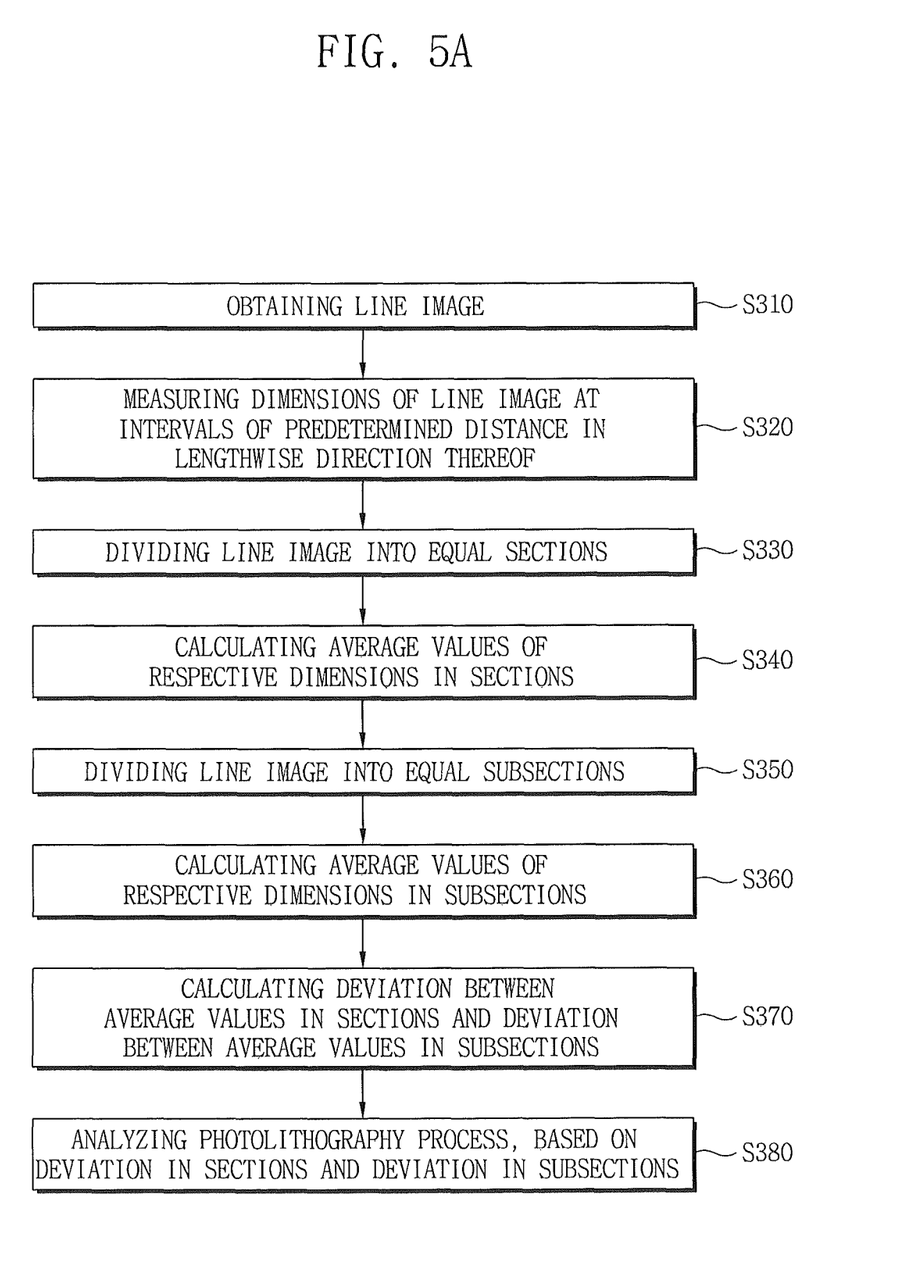
FIGS. 5A and 5B are a flowchart and a diagram illustrating a method of analyzing a photolithography process in accordance with some embodiments of the inventive concept.
Figure 5B:
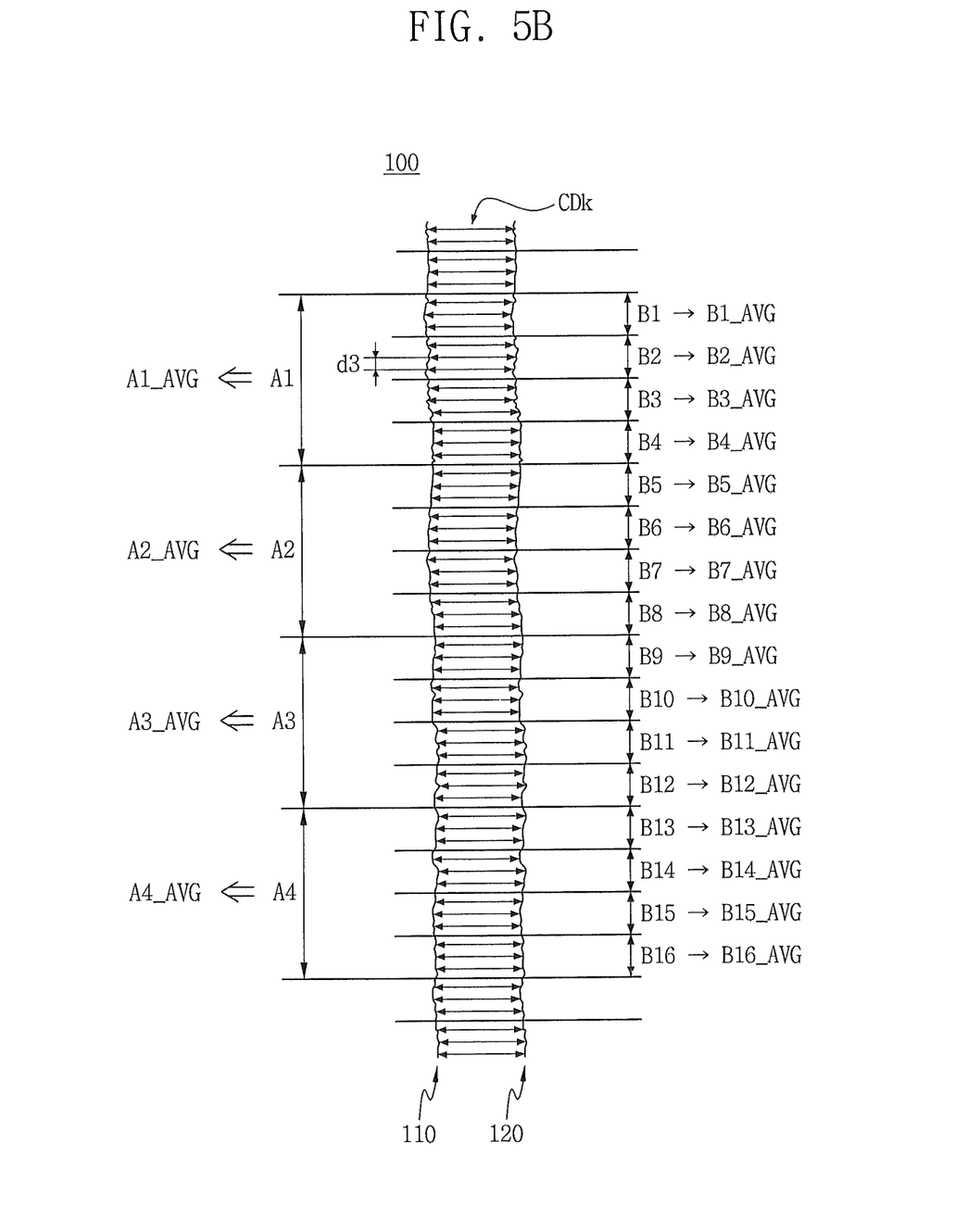

FIGS. 5A and 5B are a flowchart and a diagram illustrating a method of analyzing a photolithography process in accordance with another embodiment of the inventive concept.

Referring to FIGS. 5A and 5B, the method includes obtaining a line image 100 (S310), measuring dimensions CDk of the line image 100 at intervals of a predetermined distance d3 in a lengthwise direction thereof (S320), dividing the line image 100 into equal sections A1 to A4 (S330), calculating average values A1_AVG to A4_AVG of the respective dimensions CDk in the sections A1 to A4 (S340), dividing the line image 100 into equal subsections B1 to B16 (S350), and calculating average values B1_AVG to B16_AVG of the respective dimensions CDk in the subsections B1 to B16 (S360).

Then, the method may further include calculating a deviation between the average values A1_AVG to A4_AVG in the sections A1 to A4, and a deviation between the average values B1_AVG to B16_AVG in the subsections B1 to B16 (S370). For example, the calculating of the deviations may include calculating 3-sigmas 3σ of the respective average values A1_AVG to A4_AVG and B1_AVG to B16_AVG. Thus, the deviation in the sections A1 to A4 may represent macroscopic roughness of the dimensions CDk, and the deviation in the subsections B1 to B16 may represent microscopic roughness of the dimensions CDk.

Then, the method may further include analyzing the photolithography process, based on the deviation in the sections A1 to A4 and the deviation in the subsections B1 to B16 (S380). The deviation in the sections A1 to A4, i.e., macroscopic roughness of the dimensions CDk, and the deviation in the subsections B1 to B16, i.e., microscopic roughness of the dimensions CDk, may show a result of analyzing the low-frequency band profile graph 51 of the line image 100 and a result of analyzing the high-frequency band profile graph 52 of the line image 100, performed in S180 of FIG. 1, respectively. For example, the deviation in the sections A1 to A4 may show macroscopic uniformity of the line image 100, and the deviation in the subsections B1 to B16 may show microscopic uniformity of the line image 100. In other words, the pattern formation capability of the photolithography process may be analyzed, estimated, and predicted.

Figure 6A:
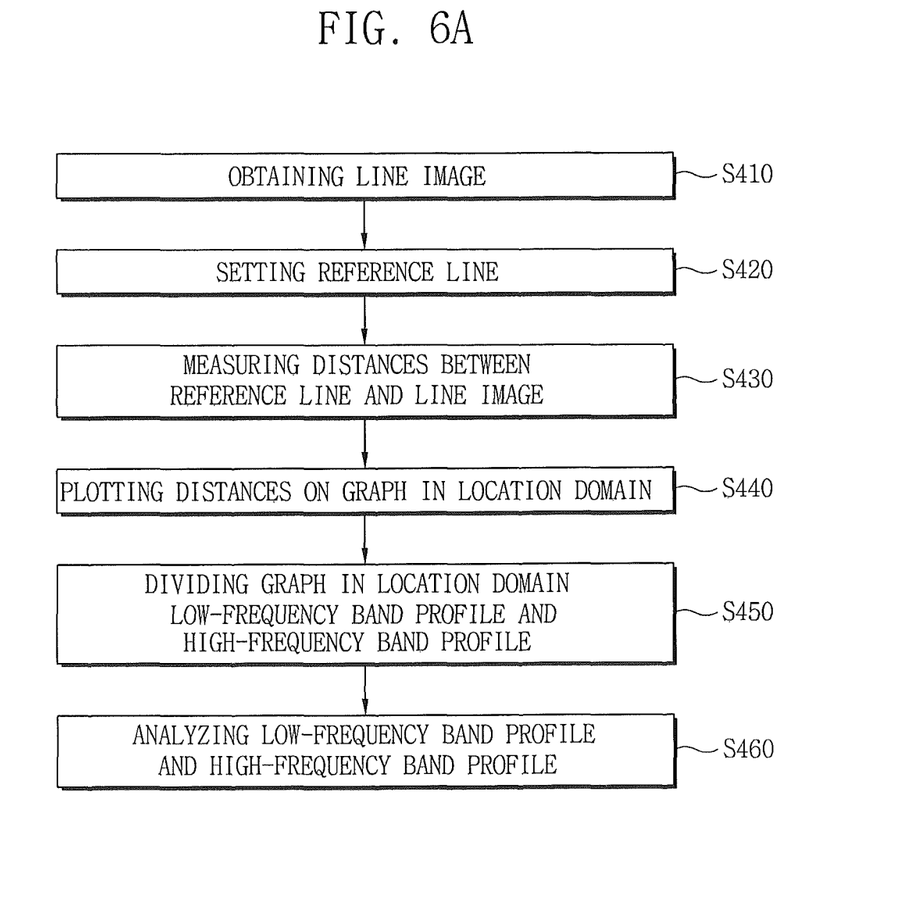
FIGS. 6A and 6B are a flowchart and a diagram, respectively, illustrating a method of analyzing a photolithography process in accordance with some embodiments of the inventive concept.
Figure 6B:
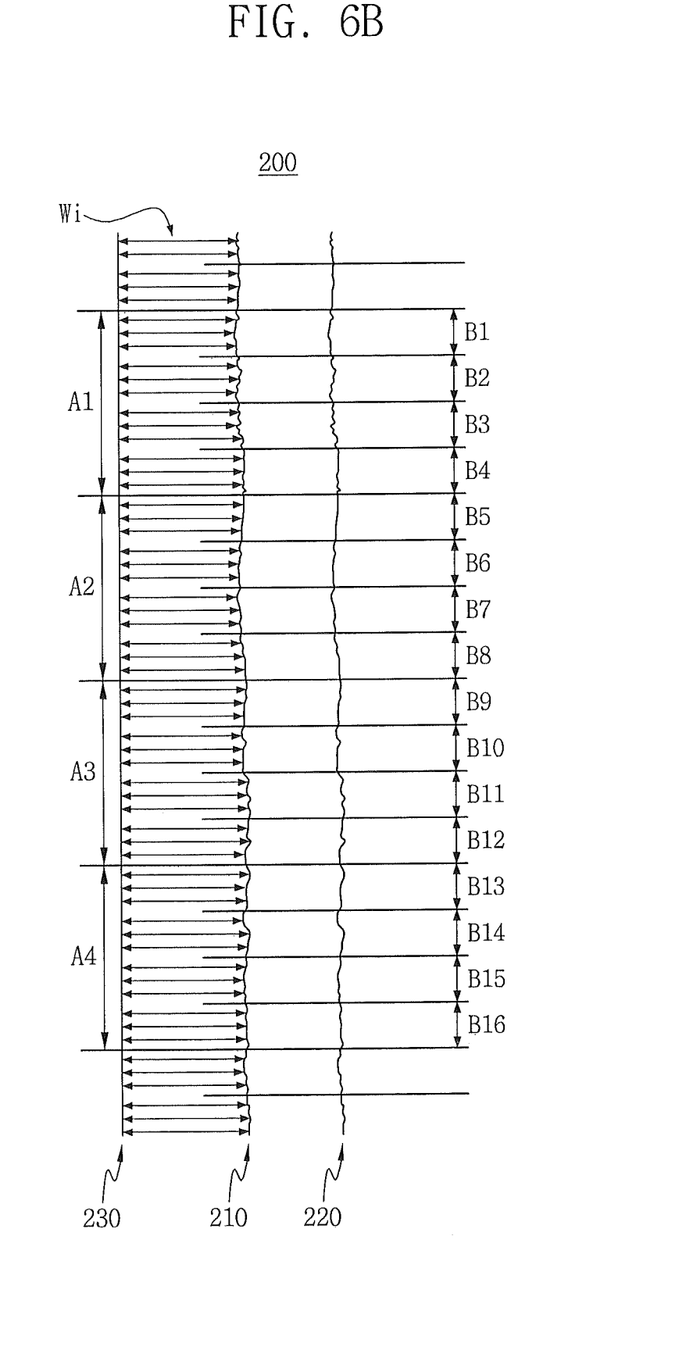

FIGS. 6A and 6B are a flowchart and a diagram illustrating a method of analyzing a photolithography process in accordance with another embodiment of the inventive concept.

Referring to FIGS. 6A and 6B, the method may include obtaining a line image 200 including a first line 210 and a second line 220 that are parallel to each other (S410), setting a reference line 230 (S420), and measuring distances between the reference line 230 and the line image 220, e.g., widths Wi between the reference line 230 and the first line 210 (S430). The reference line 230 may be set at an arbitrary location. For example, the reference line 230 may be located outside the line image 200 as illustrated in FIG. 6B, or may be located inside the line image 200.

Then, the method may further include plotting the measured widths Wi on a graph in a location domain (S440), dividing the graph in the location domain into a low-frequency band profile and a high-frequency band profile (S450), and analyzing, estimating, and predicting the photolithography process by analyzing the low-frequency band profile and the high-frequency band profile (S460).

For example, referring back to FIGS. 1 and 2A to 2E, the method of FIGS. 6A and 6B may further include plotting the measured widths Wi or measured points on a graph in a location domain, performing Fourier transform on the graph in the location domain to divide the graph into a low-frequency band graph and a high-frequency band graph in a frequency domain, performing inverse Fourier transform on the low-frequency band graph and the high-frequency band graph to produce a low-frequency band profile graph and a high-frequency band profile graph, and analyzing the low-frequency band profile graph and the high-frequency band profile graph.

Referring back to FIGS. 5A and 5B, the method of FIGS. 6A and 6B may further include dividing the line image 100 into sections and subsections in a lengthwise direction thereof, calculating average values of widths Wi of the sections and the subsections, and deviations between the average values, and analyzing the photolithography process, based on the deviations.

According to the methods described above, when patterns are formed using various photolithography processes, the process capabilities of the various photolithography processes and the effects of the various photolithography processes on the macroscopic and microscopic uniformities of each of the patterns may be numerically analyzed. Thus, when a pattern needs to be improved, an optimum photolithography process may be determined from a combination of various photolithography processes. For example, when a first pattern is formed using a first photolithography process, and is analyzed based on a method of analyzing a photolithography process in accordance with some embodiments of the inventive concept, macroscopic and microscopic pattern formation capabilities of the first photolithography process may be estimated. When a second pattern is formed using a second photolithography process, and is analyzed based on a method of analyzing a photolithography process in accordance with some embodiments of the inventive concept, macroscopic and microscopic pattern formation capabilities of the second photolithography process may be estimated. Likewise, when the pattern formation capabilities of various photolithography processes are estimated as described above, a photolithography process may be selected or be composed with combinations of process conditions, based on pattern shape, features, and/or improvements. For example, various photolithography processes may be selected according to whether macroscopic pattern uniformity is important, whether microscopic pattern uniformity is important, or whether both macroscopic pattern uniformity and microscopic pattern uniformity are important.

According to methods of analyzing photolithography processes in accordance with various embodiments of the present invention, the pattern formation capabilities and effects of various photolithography processes when a pattern is formed on a wafer may be concretely analyzed. By predicting the pattern formation capabilities of various photolithography processes, an photolithography process may be selected when a pattern needs to be improved.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A method of analyzing photolithography processes, comprising:
   obtaining a line image from a pattern formed on a wafer, the line image comprising a first line and a second line parallel to the first line;
   obtaining dimensions between the first and second lines along a lengthwise direction of the line image;
   converting the dimensions into a profile graph;
   dividing the profile graph into a low-frequency band profile graph and a high-frequency band profile graph;
   analyzing the low-frequency band profile graph to analyze macroscopic line roughness of the line image; and
   analyzing the high-frequency band profile graph to analyze microscopic line roughness of the line image.

2. The method of claim 1, wherein each of the low-frequency band profile graph and the high-frequency band profile graph comprises a graph in a location domain.

3. The method of claim 2, wherein dividing the profile graph comprises performing a Fourier transform on the profile graph to obtain a frequency graph in a frequency domain.

4. The method of claim 3, wherein dividing the profile graph further comprises dividing the frequency graph into a low-frequency band graph and a high-frequency band graph.

5. The method of claim 4, wherein dividing the profile graph further comprises performing an inverse Fourier transform on the low-frequency band graph and the high-frequency band graph to obtain the low-frequency band profile graph and the high-frequency band profile graph, respectively.

6. The method of claim 1, wherein obtaining the dimensions comprises:
   obtaining preliminary dimensions between the first and second lines along the lengthwise direction of the line image;
   dividing the line image into sections along the lengthwise direction of the line image; and
   obtaining the dimensions by calculating averages of the preliminary dimensions in the respective sections.

7. The method of claim 6, further comprising calculating standard deviations of the dimensions.

8. The method of claim 6, wherein obtaining the preliminary dimensions comprises:
measuring raw dimensions between the first and second lines along the lengthwise direction of the line image;
dividing the line image into subsections smaller than the sections along the lengthwise direction of the line image; and
obtaining the preliminary dimensions by calculating averages of the raw dimensions in the respective subsections.

9. The method of claim 1, further comprising overlapping a plurality of cross patterns on the line image, and
wherein obtaining of the dimensions between the first and second lines comprises obtaining the dimensions of the line image in regions in which the line image overlaps with the plurality of cross patterns.

10. The method of claim 9, wherein the plurality of cross patterns are disposed along the lengthwise direction of the line image.

11. The method of claim 1, wherein the line image comprises a graphic image obtained by photographing the pattern formed on the wafer.

12. A method of analyzing photolithography processes, comprising:
obtaining a line image by photographing a pattern formed on a wafer;
converting the line image into a profile graph in a location domain;
dividing the profile graph into a low-frequency band profile graph and a high-frequency band profile graph; and
analyzing the low-frequency band profile graph to analyze macroscopic line roughness of the line image and the high-frequency band profile graph to analyze microscopic line roughness of the line image.

13. The method of claim 12, wherein the line image comprises a first line and a second line parallel to the first line, and the profile graph comprises an image of the first line.

14. The method of claim 12, wherein dividing the profile graph into the low-frequency band profile graph and the high-frequency band profile graph comprises:
performing a Fourier transform on the profile graph to obtain a frequency-domain graph;
dividing the frequency-domain graph into a low-frequency band graph and a high-frequency band graph; and
performing an inverse Fourier transform on the low-frequency band graph and the high-frequency band graph to obtain the low-frequency band profile graph and the high-frequency band profile graph in the location domain.

15. A method of analyzing photolithography processes, comprising:
obtaining a line image from a pattern formed on a wafer, the line image comprising a first line and a second line parallel to the first line;
obtaining dimensions between the first and second lines along a lengthwise direction of the line image;
converting the dimensions into a profile graph; and
dividing the profile graph into a low-frequency band profile graph and a high-frequency band profile graph,
wherein obtaining the dimensions comprises:
obtaining preliminary dimensions between the first and second lines along the lengthwise direction of the line image;
dividing the line image into sections along the lengthwise direction of the line image; and
obtaining the dimensions by calculating averages of the preliminary dimensions in the respective sections, and
wherein obtaining the preliminary dimensions comprises:
measuring raw dimensions between the first and second lines along the lengthwise direction of the line image;
dividing the line image into subsections smaller than the sections along the lengthwise direction of the line image; and
obtaining the preliminary dimensions by calculating averages of the raw dimensions in the respective subsections.

16. The method of claim 15, wherein each of the low-frequency band profile graph and the high-frequency band profile graph comprises a graph in a location domain.

17. The method of claim 16, wherein dividing the profile graph comprises performing a Fourier transform on the profile graph to obtain a frequency graph in a frequency domain.

18. The method of claim 17, wherein dividing the profile graph further comprises dividing the frequency graph into a low-frequency band graph and a high-frequency band graph.

19. The method of claim 15, further comprising:
analyzing the low-frequency band profile graph to analyze macroscopic line roughness of the line image; and
analyzing the high-frequency band profile graph to analyze microscopic line roughness of the line image.

* * * * *